United States Patent [19]
Kim et al.

[11] Patent Number: 6,128,051
[45] Date of Patent: Oct. 3, 2000

[54] METHOD FOR FORMING AND APPARATUS INCLUDING A LIQUID CRYSTAL DISPLAY HAVING SHORTING BAR CONNECTOR

[75] Inventors: Jong Woo Kim; Chi Hun Ham, both of Kumi, Rep. of Korea

[73] Assignee: LG Electronics Inc., Seoul, Rep. of Korea

[21] Appl. No.: 09/139,987

[22] Filed: Aug. 26, 1998

[30] Foreign Application Priority Data

Sep. 12, 1997 [KR] Rep. of Korea ...................... 97-47247

[51] Int. Cl.[7] .............................. G02F 1/1333; G02F 1/13
[52] U.S. Cl. .............................................. 349/40; 349/192
[58] Field of Search ................................ 349/40, 192, 54, 349/138; 345/92, 904; 257/59; 438/144

[56] References Cited

U.S. PATENT DOCUMENTS

| | | | |
|---|---|---|---|
| 5,068,748 | 11/1991 | Ukai et al. ................................ | 359/59 |
| 5,233,448 | 8/1993 | Wu ............................................ | 359/59 |
| 5,373,377 | 12/1994 | Ogawa et al. ............................ | 359/59 |
| 5,668,032 | 9/1997 | Holmberg et al. ...................... | 438/144 |
| 5,684,547 | 11/1997 | Park et al. ................................ | 349/54 |
| 5,737,041 | 4/1998 | Holmberg et al. ........................ | 349/43 |
| 5,767,929 | 6/1998 | Yachi et al. ............................... | 349/40 |
| 5,781,253 | 7/1998 | Koike et al. ............................... | 349/40 |
| 5,828,428 | 10/1998 | Kim et al. .................................. | 349/40 |
| 5,926,234 | 7/1999 | Shiraki et al. ............................. | 349/40 |
| 5,936,687 | 8/1999 | Lee ............................................ | 349/40 |
| 5,949,502 | 9/1999 | Matsunaga et al. ....................... | 349/40 |
| 5,982,467 | 11/1999 | Lee .......................................... | 349/138 |
| 6,005,647 | 12/1999 | Lim ........................................... | 349/40 |
| 6,012,923 | 1/2000 | Huang ...................................... | 257/59 |
| 6,020,599 | 2/2000 | Yeo .......................................... | 257/59 |
| 6,025,891 | 2/2000 | Kim .......................................... | 349/40 |

FOREIGN PATENT DOCUMENTS 5-323375 12/1993 Japan .

Primary Examiner—James A. Dudek
Assistant Examiner—Tarifur R. Chowdhury

[57] ABSTRACT

A liquid crystal display apparatus includes a first shorting bar connected to odd-numbered gate lines and a second shorting bar connected to even-numbered gate lines of TFTs. The first shorting bar is first formed such that it is connected to all of the even-numbered and odd-numbered gate lines. The odd-numbered gate lines are directly connected to the first shorting bar. The even-numbered gate lines are connected to the first shorting bar through the shorting bar connector. The second shorting bar formed on an insulating (passivation) layer is connected only to the even-numbered gate lines. Then the shorting bar connector connecting the even-numbered gate lines to the first shorting bar is removed by etching such that the first shorting bar is only connected to the odd-numbered gate lines and the second shorting bar is only connected to the even-numbered gate lines.

12 Claims, 9 Drawing Sheets

METHOD FOR FORMING AND APPARATUS INCLUDING A LIQUID CRYSTAL DISPLAY HAVING SHORTING BAR CONNECTOR

BACKGROUND OF THE INVENTION

1. Field of the Invention

The present invention relates to a structure of a shorting bar used to test an electrical state of a liquid crystal display device (or LCD) during manufacture of an including thin film transistors (or TFTs) and a method for forming the same. More specifically, the present invention relates to a liquid crystal display apparatus including a first shorting bar connected to odd-numbered gate lines and a second shorting bar connected to even-numbered gate lines of TFTs, and a method for forming the same.

2. Description of the Background Art

Among display devices for showing visual images on a screen, thin film flat panel display devices are highly favored because of their light weight and easy adaptability. Recent research activities have focused on the development of liquid crystal display devices because of their high resolution and fast response time suitable for display of motion picture images.

A liquid crystal display device works by using polarization and optical anisotropy of a liquid crystal. By controlling the orientation of rod-shaped liquid crystal molecules via a polarization technique, transmission and interception of a light through the liquid crystal molecules are achieved due to the anisotropy of the liquid crystal. Active matrix liquid crystal displays (or AMLCDs) having TFTs arranged in a matrix pattern and pixel electrodes connected to the TFTs provide high quality images and are now widely used. The structure of a conventional AMLCD will now be described.

Generally, a liquid crystal display device is made of two panels which include several elements and are arranged to face each other with a liquid crystal material located therebetween. The first of the two panels is a color filter panel which includes a sequential arrangement of red, blue and green color filters arranged on a transparent substrate at pixel positions in a matrix pattern. Between these color filters, black matrixes are formed in a lattice pattern. On the color filters, a common electrode is formed.

The second of the panels is an active panel and includes pixel electrodes positioned in a matrix pattern of rows and columns on a transparent substrate. Along a column direction of the pixel electrodes, scan bus lines are arranged, and along a row direction of the pixel electrodes, data bus lines are arranged. At a corner of a pixel electrode, a TFT for driving the pixel electrode is provided. A gate electrode of the TFT is connected with a scan bus line which is commonly referred to as a gate line. A source electrode of the TFT is connected with a data bus line which is commonly referred to as a source line. Additionally, a gate pad is formed at the end portion of each gate line, and a source pad is formed at the end portion of each source line.

The color filter panel and the active panel are arranged to face each other and are bonded together with a certain distance located therebetween (i.e., a cell gap) Liquid crystal material fills the cell gap to complete a liquid crystal panel of an LCD.

The method of manufacturing a liquid crystal display device is very complicated including many processes. As mentioned above, the LCD is manufactured by making a color filter panel and an active panel, joining the color filter panel and the active panel together and injecting the liquid crystal material between the color filter panel and the active panel. The method of manufacturing an active panel having TFTs and pixel electrodes is even more complicated especially if the active panel has a shorting bar for providing protection from static electricity and for testing the manufactured active panel. Therefore, it is important to simplify the method for manufacturing an active panel to reduce the possibility of defects during the manufacture process.

A conventional method for manufacturing an active panel having a shorting bar is described with reference to FIG. 1 showing a plan view of a conventional active panel and FIGS. 2a–2f showing cross sectional views taken along line II—II of FIG. 1.

Aluminum or an aluminum alloy is deposited on a transparent substrate 1, such as a non-alkalic glass to make an aluminum layer. A low resistance gate line 13a and a low resistance gate pad 15a are formed by patterning the aluminum layer. The low resistance gate line 13a extends along the row direction of the pixels which are arranged in a matrix array. The low resistance gate pad 15a is disposed at the end of the low resistance gate line 13a, as shown in FIG. 2a.

A metal formed of one of chromium, molybdenum, tantalum or antimony is deposited on the substrate having the low resistance gate line 13a and the low resistance gate pad 15a. A gate line 13, a gate pad 15, a gate electrode 11 and an odd-numbered gate shorting bar (or odd shorting bar) 61 are formed by patterning the metal layer. The gate line 13 covers the low resistance gate line 13a. The gate pad 15 covers the low resistance gate pad 15a. The gate electrode 11 extends from the gate line 13 as seen in FIG. 1 and is formed at one corner of the pixel. The odd gate shorting bar 61 is disposed along the array direction of the gate line 13. In general, the shorting bar 61 is disposed at the edge of the substrate 1 of the active panel, as shown in FIG. 2b.

A first inorganic material such as silicon nitride or silicon oxide is deposited on the substrate having the gate elements including the gate line 13, the gate pad 15 and the gate electrode 11 so as to make a gate insulating layer 17. An intrinsic semiconductor material such as pure amorphous silicon and an extrinsic semiconductor material such as impurity doped amorphous silicon are sequentially deposited thereon. A semiconductor layer 33 and a doped semiconductor layer 35 are formed by patterning the intrinsic and extrinsic semiconductor layers on the gate electrode 11, as shown in FIG. 2c.

A metal such as chromium is deposited on the substrate having the doped semiconductor layer 35. A source line 23, a source electrode 21 and a drain electrode 31 are formed by patterning the metal layer. The source line 23 is substantially perpendicularly intersecting with the gate line 13 and arranged along the column direction. The source electrode 21 extends from the source line 23 as seen in FIG. 1 and overlaps one side of the gate electrode 11 wherein the semiconductor layer 33 and the doped semiconductor 35 are sandwiched therebetween. The drain electrode 31 faces the source electrode 21 and overlaps the other side of the gate electrode 11. The doped semiconductor layer 35 is separated into two parts using the source electrode 21 and the drain electrode 31 as a mask. The doped semiconductor layer 35 is in ohmic contact with the source electrode 21 and the drain electrode 31, as shown in FIG. 2d.

A passivation layer 137 is formed by depositing an inorganic insulating material such as a silicon nitride or a silicon oxide on the substrate having the source electrode 21, the drain electrode 31 and so on. A drain contact hole 71 exposing a portion of the drain electrode 31 is formed by patterning the passivation layer 137. A gate contact hole 51 exposing a portion surface of the gate pad 15 is formed by patterning the passivation layer 137 and the gate insulating layer 17 covering the gate pad 15, as shown in FIG. 2e.

A transparent conductive material such as an ITO (Indium Tin Oxide) is deposited on the passivation layer 137 and patterned to form a pixel electrode 41, a gate pad terminal 57 and an even-numbered gate shorting bar (or even shorting bar) 63. The pixel electrode 41 is connected to the drain electrode 31 through the drain contact hole 71 and is disposed at the pixel area. The gate pad terminal 57 is connected to the gate pad 15 through the gate contact hole 51. The even shorting bar 63 is disposed in parallel with the odd shorting bar 61 and connected to the even-numbered gate pads 15 which are connected to the even-numbered gate lines 13, as shown in FIG. 2f.

The structure of the shorting bar made according to the conventional method of manufacturing an active panel is formed as follows. The odd-numbered gate pads are connected to each other through the odd gate shorting bar which is simultaneously formed with the gate line and the gate pad. A gate insulating layer and a passivation layer are disposed thereon. The even gate shorting bar connected to the even gate pad 15 and the even gate line 13 is then disposed on the passivation layer 137. Then, an even/odd line test is done to determine which line is cut and/or shorted with any other line so as to detect defects.

As described above, the conventional method for manufacturing the active panel comprises six masking steps or processes. Using this method, the odd gate line group and the even gate line group are in different electrical potential states from a time or step when forming the odd shorting bar to a time or step when forming the even shorting bar. So, when static electricity is created at the separated gate line groups, the gate insulating layer can be damaged and/or certain gate lines can be cut by the difference in the static electricity.

SUMMARY OF THE INVENTION

To overcome the problems described above, the preferred embodiments of the present invention provide a method of forming at least first and second shorting bars which have the same electrical potential state and shorting bar structure formed in the same method step. In addition, the preferred embodiments of the present invention provide a method for forming an odd gate shorting bar and an even gate shorting bar having the same electrical potential state without requiring any additional processing steps in manufacturing an LCD and the shorting bar structure.

According to a preferred embodiment of the present invention, a method includes the steps of forming a shorting bar connector on a substrate using a first metal; forming a shorting bar using a second metal which is different from the first metal and so that the shorting bar covers the shorting bar connector; forming an insulating layer on the shorting bar connector and the shorting bar; and forming a cutting hole in the insulating layer to expose at least a portion of the shorting bar connector.

According to another preferred embodiment of the present invention, an active matrix liquid crystal display panel includes a substrate, a shorting bar connector made of a first metal and located on the substrate, a shorting bar made of a second metal which is different from the first metal and located at least partially on the shorting bar connector and an insulating layer covering the shorting bar connector and the shorting bar substrate.

These and other elements, features, and advantages of the preferred embodiments of the present invention will be apparent from the following detailed description of the preferred embodiments of the present invention, as illustrated in the accompanying drawings.

BRIEF DESCRIPTION OF THE ATTACHED DRAWINGS

DETAILED DESCRIPTION OF PREFERRED EMBODIMENTS

Preferred embodiments of the present invention will now be described with reference to the drawings. More specifically, with reference to FIG. 3 which shows an enlarged plan view of an active panel and FIGS. 4a–4f showing the cross sectional views of the active panel along cutting line IV—IV of the FIG. 3, a method for manufacturing an active panel according to preferred embodiments of the present invention is described. Also, with reference to FIGS. 5, 6, 7, 8 and 9, various examples of the structure of the shorting bar connector according to preferred embodiments of the present invention are described.

Figure 1:
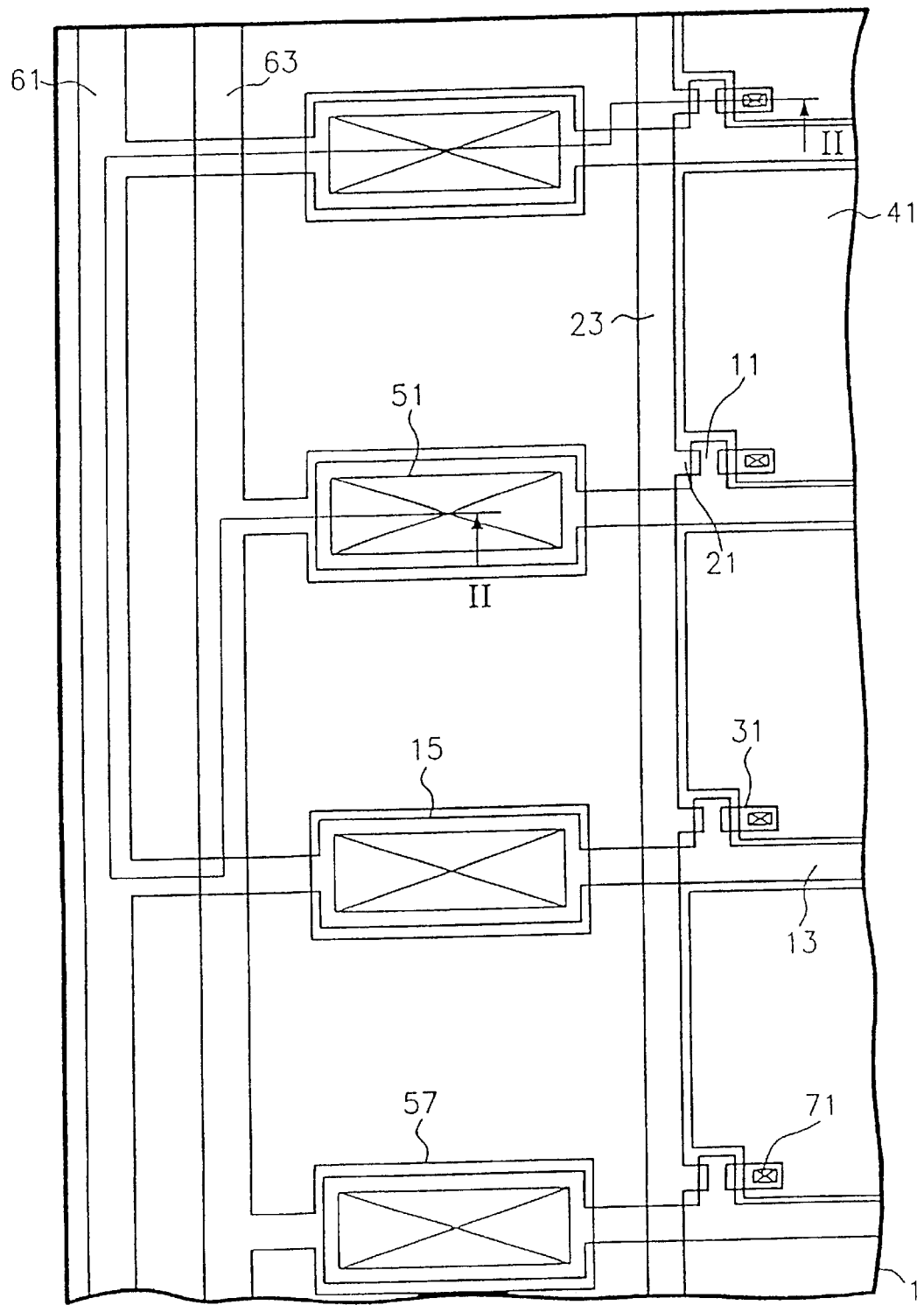
FIG. 1 is an enlarged plan view showing an active panel having a shorting bar according to a conventional device.
Figure 2A:
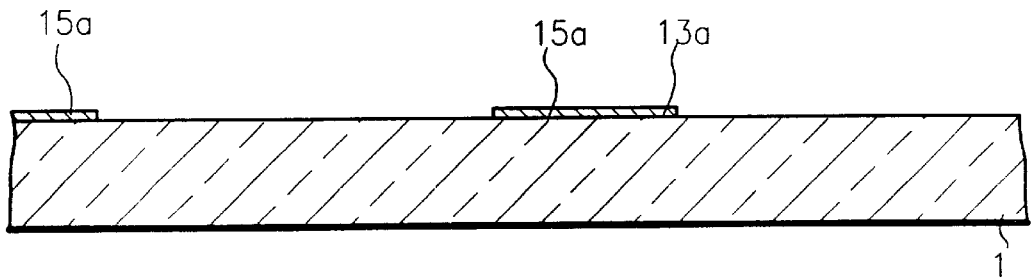
FIGS. 2a–2f are the cross-sectional views showing a conventional method for manufacturing an active panel having a shorting bar.
Figure 2B:
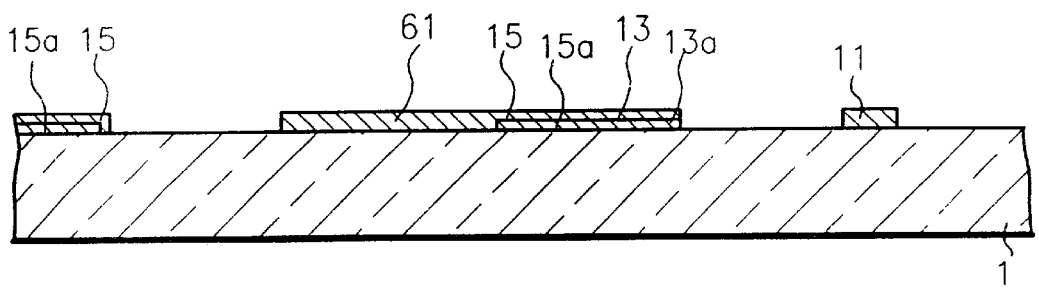
Figure 2C:
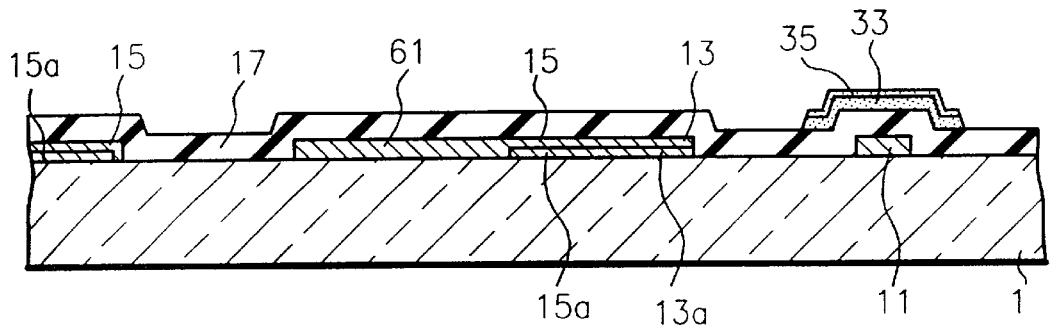
Figure 2D:
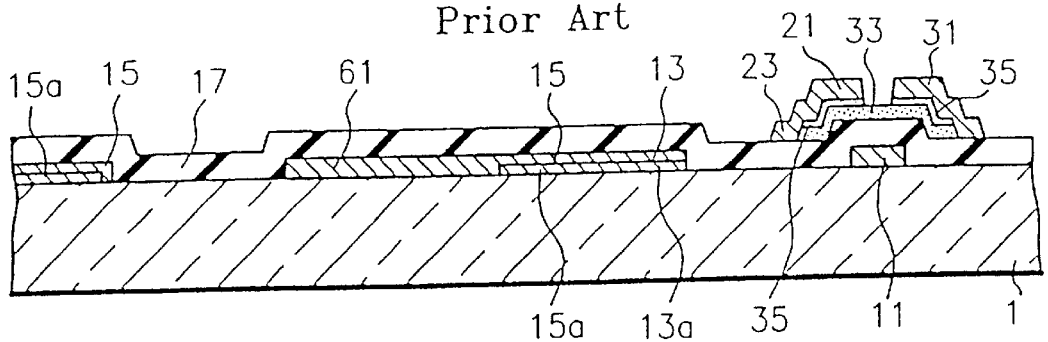
Figure 2E:
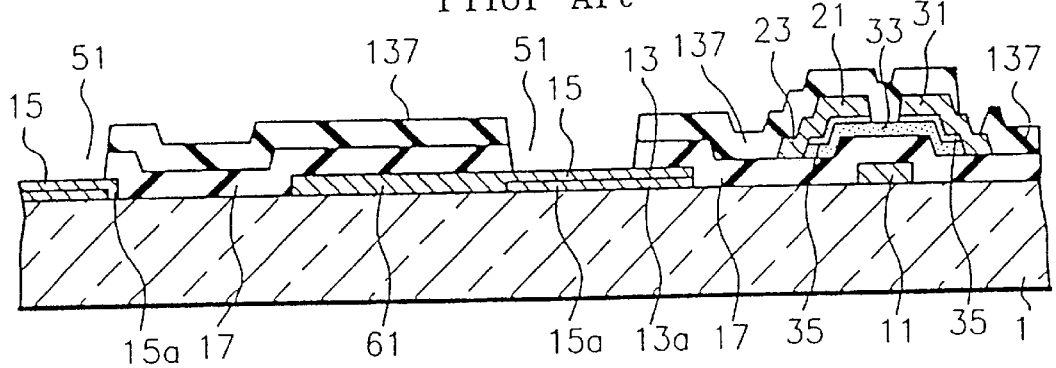
Figure 2F:
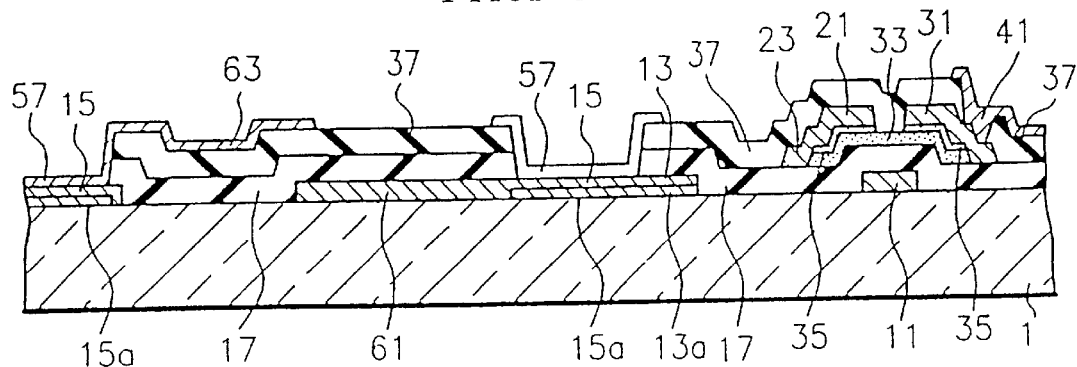
Figure 3:
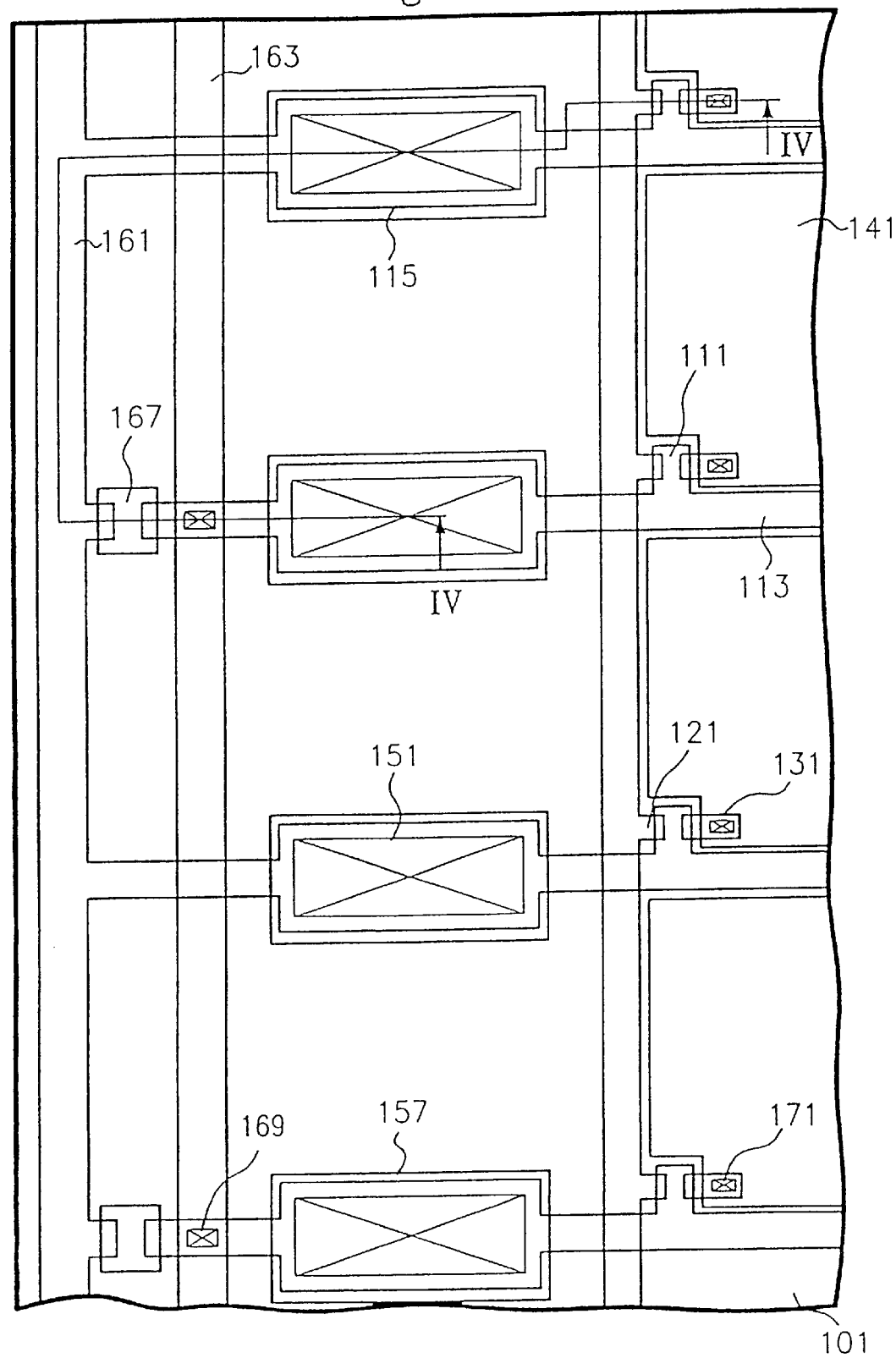
FIG. 3 is an enlarged plan view showing an active panel having a shorting bar according to preferred embodiments of the present invention.
Figure 4A:
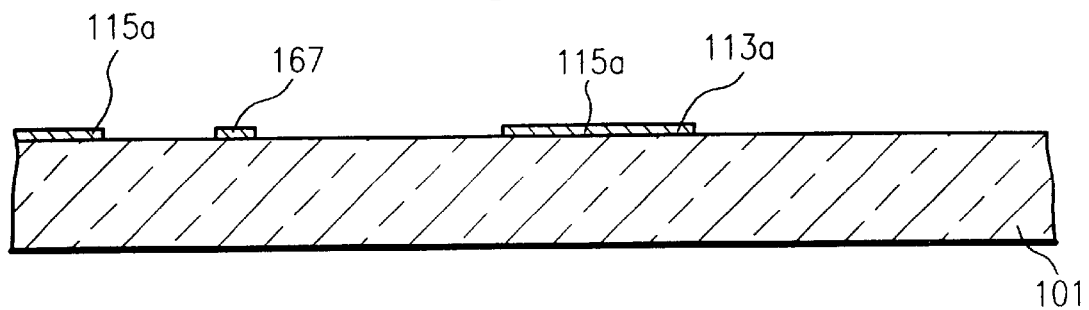
FIGS. 4a–4f are cross-sectional views showing a method for manufacturing an active panel having a shorting bar according to preferred embodiments of the present invention.
Figure 4B:
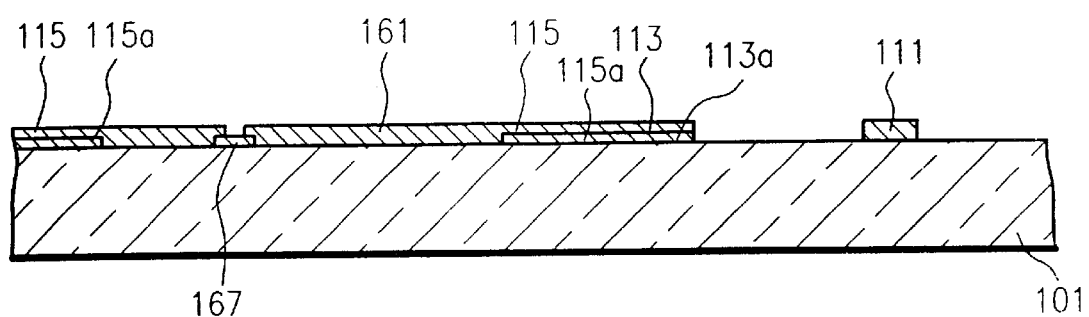

As seen in FIG. 4a, aluminum or an aluminum alloy is deposited on a transparent glass substrate 101 to form an aluminum layer. The aluminum layer is patterned to form a low resistance gate line 113a, a low resistance gate pad 115a and a shorting bar connector 167. Thus, the shorting bar connector 167 is formed of the same material, i.e. aluminum or aluminum alloy, that is used to form the gate line 113a and the gate pad 115a. The low resistance gate line 113a extends along the row direction of the pixels which are disposed in a matrix array as shown in FIG. 3. The low resistance gate pad 115a is disposed at the end of the low resistance gate line 113a. The shorting bar connector 167 is disposed at the extended portion of a gate pad 115 as shown in FIG. 4b and has an island shape as shown in FIG. 4a.

A metal layer, preferably formed of one of chromium, molybdenum, tantalum or antimony, is deposited on the substrate having the low resistance gate pad 113a, the low resistance gate pad 115a and the shorting bar connector 167. A gate line 113, an even gate pad 115, a gate electrode 111 and an odd gate shorting bar (or odd shorting bar) 161 are formed by patterning the metal layer. The gate line 113 is arranged to cover the low resistance gate line 113a. The even gate pad 115 is arranged to cover the low resistance gate pad 115a and is connected to the end of the gate line 113. The gate electrode 111 extends from the gate line 113 and is located at one corner of the pixel. The odd shorting bar 161 connected to the even gate pad 115 extends in the column direction. A branched portion of an odd shorting bar 161 will be disposed over the shorting bar connector 167 so as to be connected to the even gate pad 115. The even gate pad 115 is connected to the odd shorting bar 161 via the shorting bar connector 167 as shown in FIG. 4b.

Figure 4C:
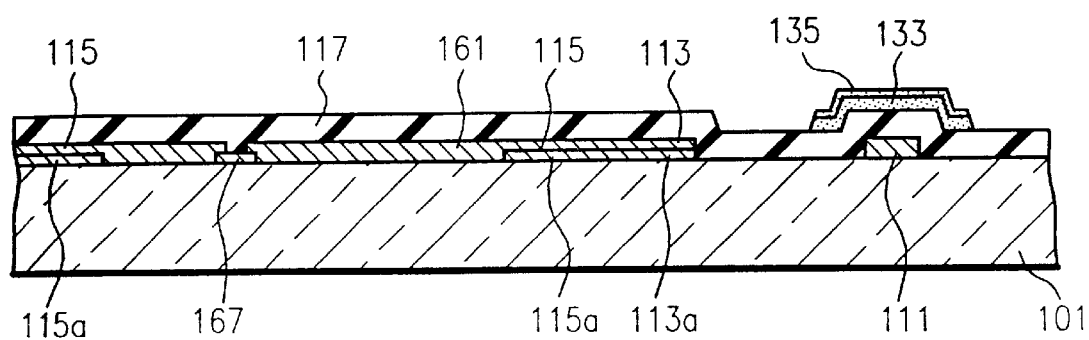

An inorganic material such as silicon nitride or silicon oxide is deposited on the substrate having the gate elements (the gate line 113, the gate pad 115 and the gate electrode 111) so as to define a gate insulating layer 117. An intrinsic semiconductor material such as pure amorphous silicon and an extrinsic semiconductor material such as impurity doped amorphous silicon are sequentially deposited thereon. A semiconductor layer 133 and a doped semiconductor layer 135 are formed by patterning the intrinsic and extrinsic semiconductor layers on the gate electrode 111, as shown in FIG. 4c.

Figure 4D:
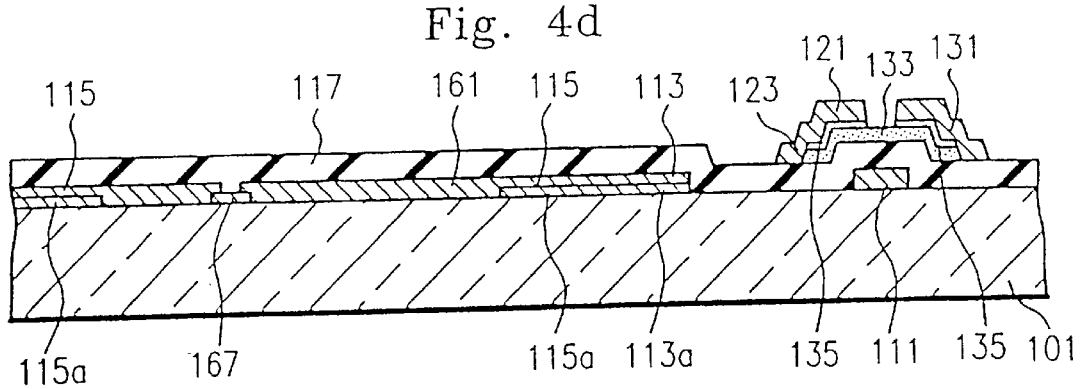

A metal such as a chromium is deposited on the substrate having a doped semiconductor layer 135. A source line 123, a source electrode 121 and a drain electrode 131 are formed by patterning the metal layer. The source line 123 is substantially perpendicularly intersecting with the gate line 113 and is arranged to extend in the column direction. The source electrode 121 extends from the source line 123 and overlaps with one side of the gate electrode 111 wherein the semiconductor layer 133 and the doped semiconductor 135 are sandwiched therebetween. The drain electrode 131 faces the source electrode 121 and overlaps with the other side of the gate electrode 111. The doped semiconductor layer 135 is separated into two parts using the source electrode 121 and the drain electrode 131 as a mask. The doped semiconductor layer 135 is disposed in ohmic contact with the source electrode 121 and the drain electrode 131 as shown in FIG. 4d.

Figure 4E:
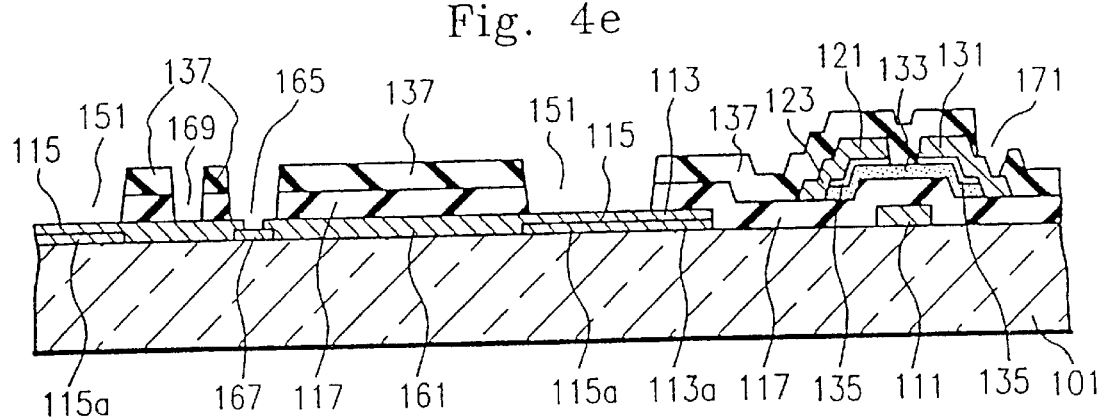

A passivation layer 137 is formed by depositing an inorganic insulating material such as a silicon nitride or a silicon oxide, or an organic insulating material such as a BCB (benzocyclobutene) or an acrylic resin on the substrate having the source electrode 121, the drain electrode 131 and so on. A drain contact hole 171 exposing a portion of the surface of the drain electrode 131 is formed by patterning the passivation layer 137. A gate contact hole 151 exposing a portion of the surface of the gate pad 115 is formed by patterning the passivation layer 137 and the gate insulating layer 117 covering the gate pad 115. A shorting bar contact hole 169 exposing a portion of the branched portion of the odd gate shorting bar 161 connected to the gate pad 115 is formed by the same method. A cutting hole 165 exposing the shorting bar connector 167 is formed as shown in FIG. 4e.

Figure 4F:
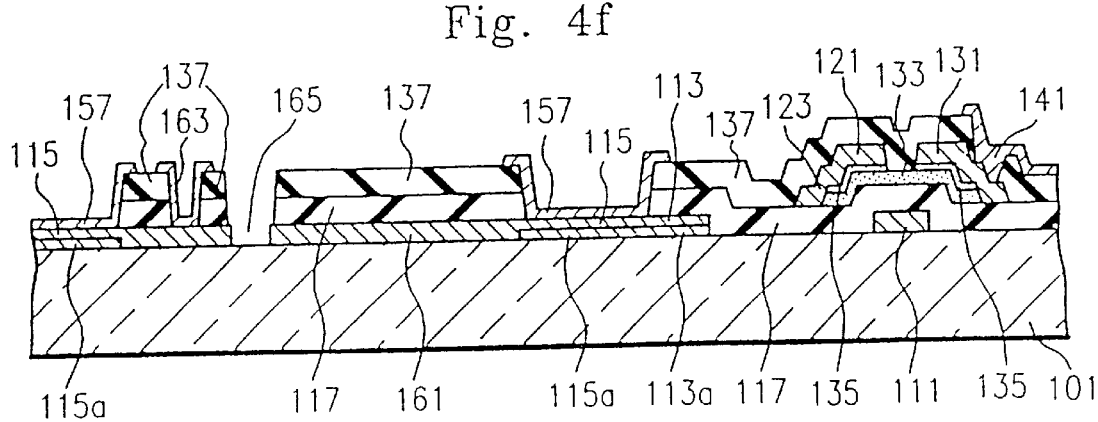

A transparent conductive material such as an ITO(Indium Tin Oxide) is deposited on the passivation layer 137 and patterned to form a pixel electrode 141, a gate pad terminal 157 and an even gate shorting bar (or even shorting bar) 163. The pixel electrode 141 is connected to the drain electrode 131 through the drain contact hole 171 and is disposed at the pixel area. The gate pad terminal 157 is connected to the gate pad 115 via the gate contact hole 151. The even shorting bar 163 is arranged substantially in parallel with the odd shorting bar 161 and connected to the even gate pad 115 through the shorting bar contact hole 169. At this time, the shorting bar connector 167 exposed through the cutting hole 165 comprising an aluminum is etched by the etchant for ITO. Then the shorting bar connector 167 is removed and the portion of the odd gate shorting bar 161 overlapped with the shorting bar connector 167 is lifted off and removed. As a result, the odd gate line group and the even gate line group are electrically disconnected as shown in FIG. 4f.

Figure 5A:
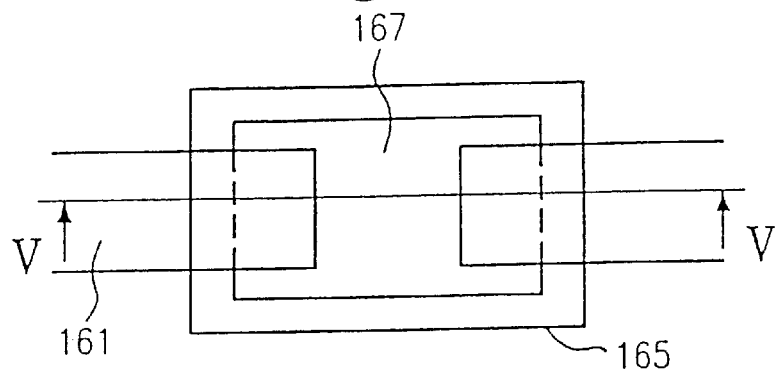
FIGS. 5a and 5b show a first example of a shorting bar connector according to preferred embodiments of the present invention.
Figure 5B:
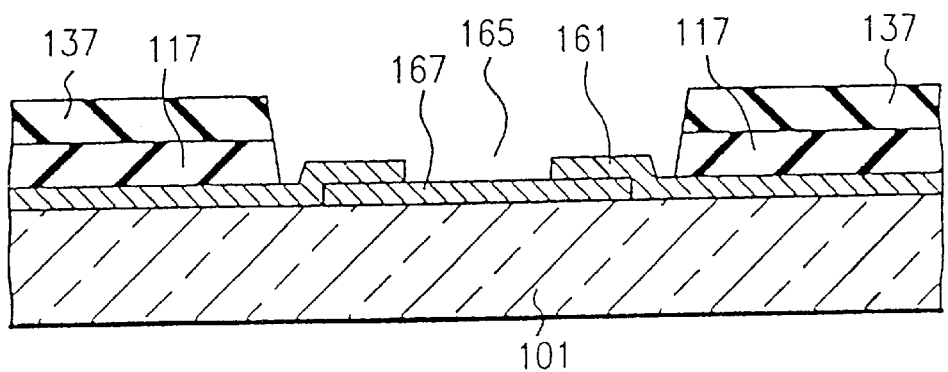
Figure 6A:
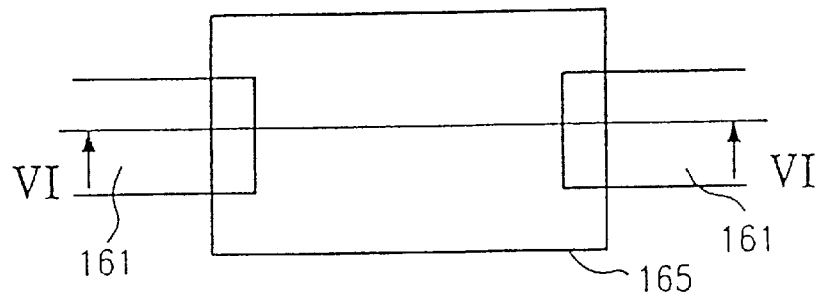
FIGS. 6a and 6b show the shorting bar after the shorting bar connector is removed in the first example according to preferred embodiments of the present invention.
Figure 6B:
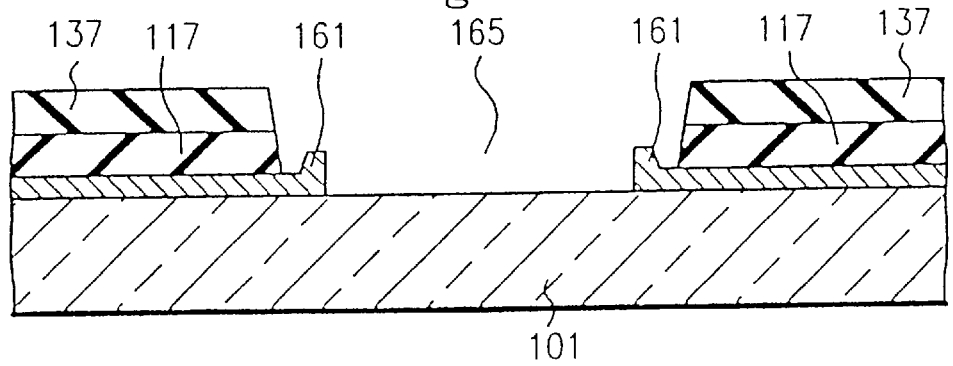

The preferred shape and the step of forming and cutting of the shorting bar connector will be explained in more detail. FIG. 5a shows the enlarged plan view of the active panel part having the shorting bar connector 167. FIG. 5b shows the cross sectional view along the cutting line V—V of FIG. 5a. FIG. 6a shows the enlarged plan view of the active panel after the shorting bar is removed. FIG. 6b shows the cross-sectional view along the cutting line VI—VI of FIG. 6a.

In order to easily cut the shorting bar connector 167 during the ITO patterning step without adding an additional process step, the shorting bar 167 comprises a material which is easily etched by the etchant used for etching the ITO layer. Generally, aluminum is highly reactive with the ITO etchant and therefore, the shorting bar connector 167 is formed when the low resistance gate line 113 and the low resistance gate pad 115 comprising aluminum are formed. The shorting bar connector 167 is located between the odd shorting bar 161 and the even gate pad 115 has an island shape as seen in FIG. 3. Then the odd shorting bar 161 is formed using a metal which is not etched by the ITO etchant such as molybdenum, tantalum, chromium and antimony, when the gate line 113, the gate pad 115 and the gate electrode 111 are etched. Here, the odd shorting bar 161 is connected to one side of the shorting bar connector 167 and the even gate pad 115 is connected to the other side of the shorting bar connector 167. In this preferred embodiment, the shorting bar connector 167 is connected to the odd gate shorting bar 161 and the even gate pad 115 using a divided branched portion extending from the odd gate shorting bar 161.

In the plan view of FIG. 5a, the shorting bar connector 167 appears to have a substantially H-shaped aluminum island layer, because its width is larger than that of the connecting parts of the odd shorting bar 161 and the gate pad 115, thereby ensuring a reliable electrical connection, as shown in FIGS. 5a and 5b. If the width of the shorting bar connector 167 is more narrow than that of the connecting part of the odd shorting bar 161 and the gate pad 115, then it appears as a short island segment.

The cutting hole 165 is formed to have a larger size than the shorting bar connector 167 to entirely expose the shorting bar connector 167. Then the shorting bar connector 167 is removed easily during the etching of the ITO layer as shown in FIGS. 6a and 6b. At that time, the gate pad terminal 157 and the even shorting bar 163 are also formed as shown in FIG. 4f.

In this preferred embodiment, the odd shorting bar 161 is formed with the gate metal and the even shorting bar 163 is formed with the ITO. It is easy to perform this process and design in reverse in which the shorting bar connector 167 would be connected to the even shorting bar 163 and the odd-numbered gate lines and would be made of gate metal and the odd shorting bar 161 would be made of ITO.

Figure 7A:
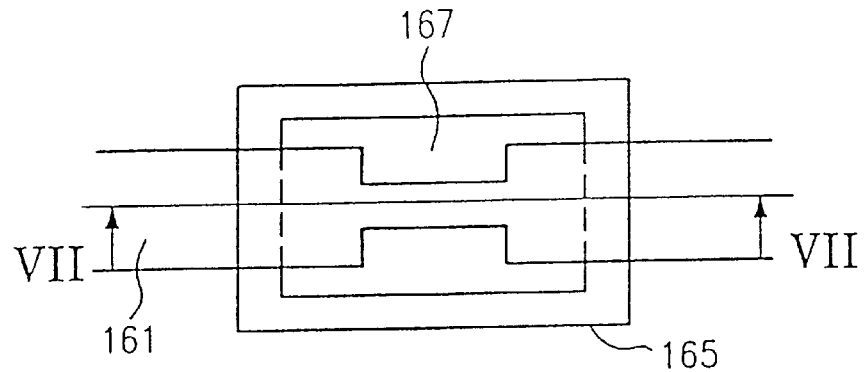
FIGS. 7a and 7b show a second example of a shorting bar connector according to preferred embodiments of the present invention.
Figure 7B:
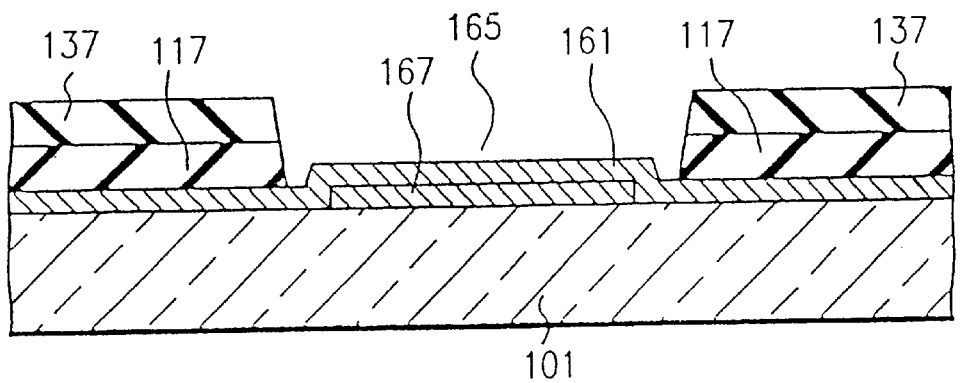
Figure 8A:
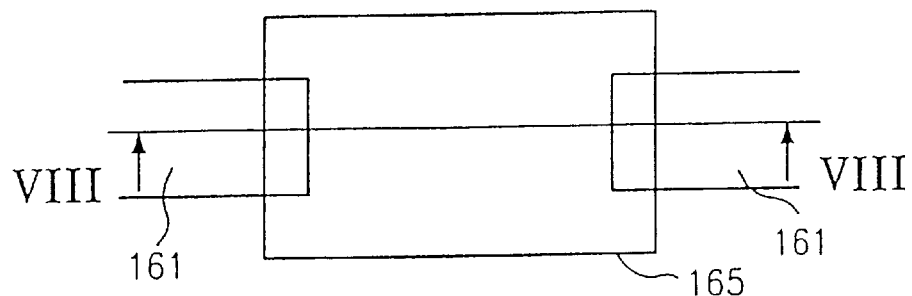
FIGS. 8a and 8b show the shorting bar after the shorting bar connector is removed in the second example according to preferred embodiments of the present invention.
Figure 8B:
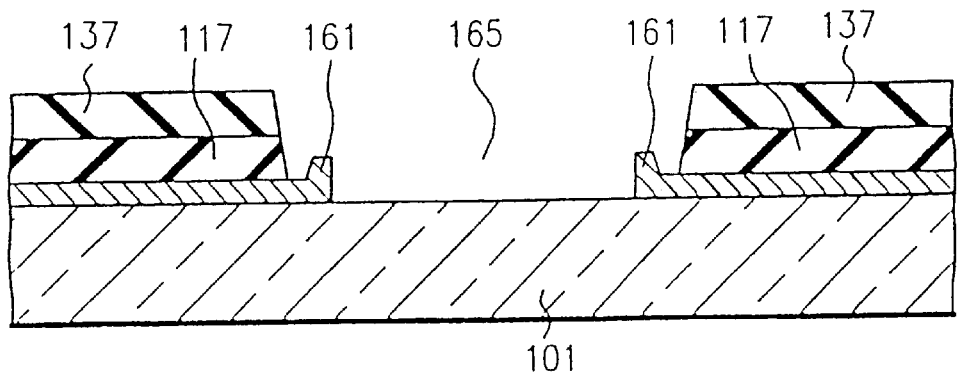

As mentioned in the above description of the first preferred embodiment, the shorting bar connector 167 is not able to easily connect with the shorting bar 161 and the gate pad 115 when it comprises only an aluminum layer due to the thermal stress and other conditions. In order for the shorting bar connector 167 to be easily and reliably connected to the shorting bar 161, a second preferred embodiment provides another design of the shorting bar connector 167. FIG. 7a shows the enlarged plan view of the active panel part having the shorting bar connector 167 according to the second preferred embodiment. FIG. 7b shows the cross sectional view along the cutting line VII—VII of FIG. 7a. FIG. 8a shows the enlarged plan view of the active panel after the shorting bar is removed. FIG. 8b. shows the cross sectional view along the cutting line VIII—VIII of FIG. 8a.

The shorting bar connector 167 is formed when the low resistance gate line 113 and the low resistance gate pad 115 comprising aluminum are formed. The shorting bar connector 167 is disposed between the odd shorting bar 161 and the even gate pad 115 with an island shape as in the first preferred embodiment. Then the odd shorting bar 161 is formed using a metal which is not etched by the ITO etchant such as molybdenum, tantalum, chromium and antimony when the gate line 113, the gate pad 115 and the gate electrode 111. At this time, the shorting bar connector 167 covered by a wire-shaped metal layer which is extended from the odd shorting bar 161 and connected to the even gate pad 115. Here, the wire-shaped metal layer which is covering the shorting bar connector 167 is narrower than the other parts. In plan view, the shorting bar connector 167 preferably has a substantially H-shaped part which is covering the aluminum layer of the shorting bar connector 167, as shown in FIGS. 7a and 7b.

The cutting hole 165 is formed to have a larger size than the aluminum layer of the shorting bar connector 167 to entirely expose the aluminum layer. Then the aluminum layer of the shorting bar connector 167 is removed easily during the etching of the ITO layer. At the same time, the narrowed portion of the wire-shaped metal layer and overlapped portion of the odd gate shorting bar 161 covering the shorting bar connector 167 are removed by lifting off resulting from etching and/or undercutting the aluminum layer underneath them, as shown in FIGS. 8a and 8b.

Figure 9A:
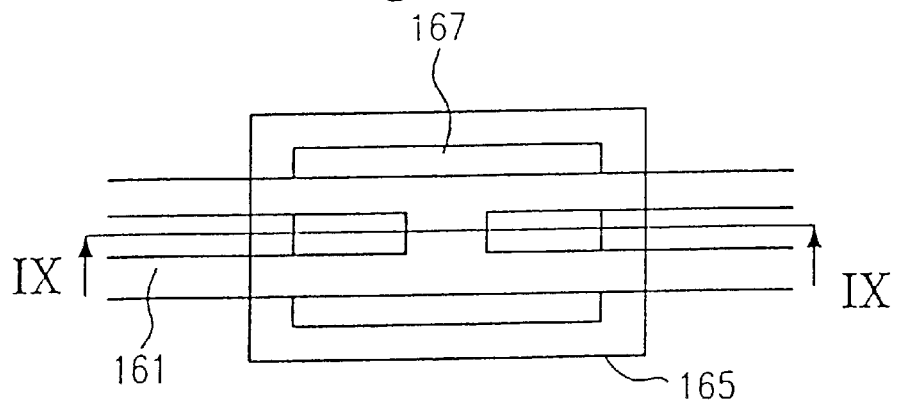
FIGS. 9a and 9b show the third example of a shorting bar connector according to preferred embodiments of the present invention.
Figure 9B:
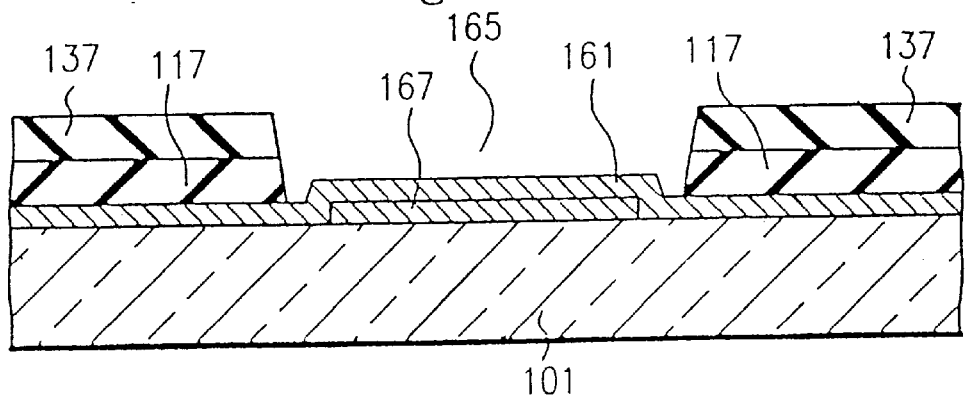
Figure 10A:
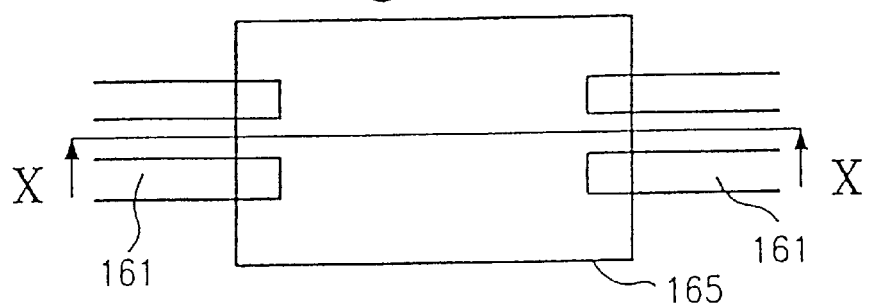
FIGS. 10a and 10b show the shorting bar after the shorting bar connector is removed in the third example according to preferred embodiments of the present invention.
Figure 10B:
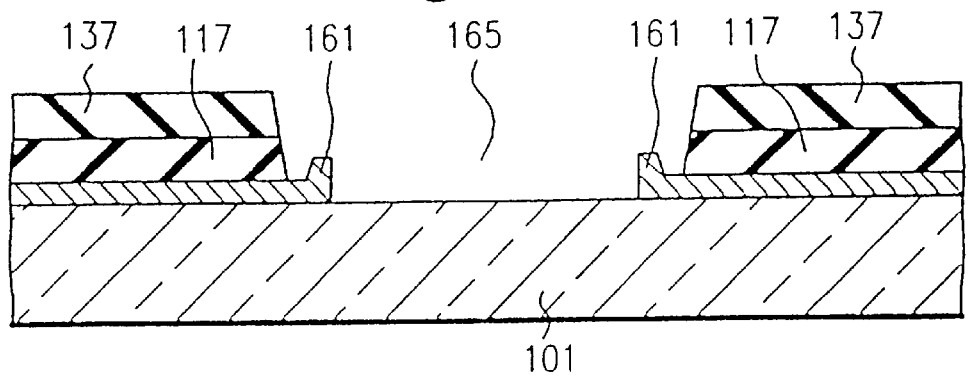

A third preferred embodiment provides another method of designing the shorting bar connector. FIG. 9a shows the enlarged plan view of the active panel part having the shorting bar connector arranged according to the third preferred embodiment. FIG. 9b shows the cross sectional view along the cutting line IX—IX of FIG. 9a. FIG. 10a shows the enlarged plan view of the active panel after the shorting bar has been removed. FIG. 10b. shows the cross sectional view along the cutting line X—X of FIG. 9a.

The shorting bar connector 167 is formed when the low resistance gate line 113 and the low resistance gate pad 115 comprising aluminum are formed. The shorting bar connector 167 is disposed on the extended portion of the even gate line 115 in an island shape like in the first preferred embodiment. Then the odd shorting bar 161 is formed using a metal, such as such as molybdenum, tantalum, chromium and antimony, which metal is not etched by the ITO etchant when the gate line 113, the gate pad 115 and the gate electrode 111 are etched. At this time, the shorting bar connector 167 is covered by two narrowed wire-shaped metal layers extending from the odd shorting bar 161 and connected to the even gate pad 115 as seen in FIG. 10a and they are connected to each other by a bridge portion of the shorting bar connector 167. In plan view, the shorting bar connector 167 has a substantially H-shape covering the aluminum layer of the shorting bar connector 167 as shown in FIGS. 9a and 9b.

The cutting hole 165 is preferably formed to have a larger size than the aluminum layer of the shorting bar connector 167 to entirely expose the aluminum layer. Then the aluminum layer of the shorting bar connector 167 is removed easily during the etching of the ITO layer. At the same time, the two narrowed wire-shaped metal layers and the bridge portion covering the shorting bar connector 167 is removed by lifting off resulting from etching and/or undercutting the aluminum layer underneath them as shown in FIGS. 10a and 10b.

The preferred embodiments of the present invention provide a unique structure and arrangement of a shorting bar used for providing protection from static electricity occurring during a manufacturing process and during testing of quality of elements such as TFTs and signal lines of a liquid crystal display apparatus. According to preferred embodiments of the present invention, the first shorting bar is connected to all of the gate lines so that the gate lines can be completely free from static electricity.

When the pixel electrode is formed, the second shorting bar connected to the even-numbered gate lines is formed. Then, the connecting part (shorting bar connector) which connects the even-numbered gate lines to the first shorting bar is removed. In order to allow the connecting part to be easily removed, the connecting part is preferably formed to comprise an island shaped aluminum layer and/or a covering metal layer having a narrow wire-shape. Such a structure allows the connecting part to be easily removed by the ITO etchant without any additional process steps.

While the invention has been particularly shown and described with reference to preferred embodiments thereof, it will be understood by those skilled in the art that the forgoing and other changes in form and details may be made therein without departing from the spirit of the invention.

What is claimed is:

1. A method for manufacturing an active panel of a liquid crystal display device, the method comprising the steps of:

forming a shorting bar connector on a substrate using a first metal;

forming a shorting bar using a second metal which is different from the first metal and so that the shorting bar covers the shorting bar connector;

forming an insulating layer on the shorting bar connector and the shorting bar; and forming a cutting hole in the insulating layer to expose at least a portion of the shorting bar connector.

2. The method according to claim 1, further comprising a step of:

depositing a conductive material on the insulating layer and patterning the conductive material wherein the portion of the shorting bar connector exposed through the cutting hole is removed simultaneously with the patterning step.

3. The method according to claim 2, wherein the step of patterning includes etching the conductive material using an etchant, wherein the portion of the shorting bar connector exposed through the cutting hole is etched by the etchant used for patterning the conductive material.

4. The method according to claim 1, wherein a size of the cutting hole is larger than a size of the shorting bar connector.

5. The method according to claim 1, wherein the shorting bar is divided and disposed at two opposite sides of the shorting bar connector.

6. The method according to claim 1, further comprising the step of forming a wire-shaped layer of the second metal and on the shorting bar connector such that the wire-shaped layer has a substantially H-shaped portion.

7. The method according to claim 1, further comprising the step of forming two wire-shaped layers and a bridge portion connecting the two wire-shaped layers of the second metal and on the shorting bar connector such that the wire-shaped layer has a substantially H-shaped portion.

8. The method according to claim 1, wherein during the step of forming the shorting bar connector, a low resistance gate element is formed of the first metal; and during the step of forming the shorting bar, a gate element covering the low resistance gate element is formed of the second metal.

9. The method according to claim 1, wherein the first metal comprises aluminum.

10. The method according to claim 1, wherein the second metal comprises at least one of molybdenum, tantalum, chromium and antimony.

11. The method according to claim 1, wherein the shorting bar is a first shorting bar, the method further comprising the stop of forming a second shorting bar which is connected to the first shorting bar via the shorting bar connector.

12. The method according to claim 11, wherein the first shorting bar and the second shorting bar are disconnected when the shorting bar connector is removed via etchant during a patterning step.

* * * * *